March 27, 1934.   C. H. HAVILL   1,952,799
PROPELLER
Filed July 11, 1930    2 Sheets-Sheet 1
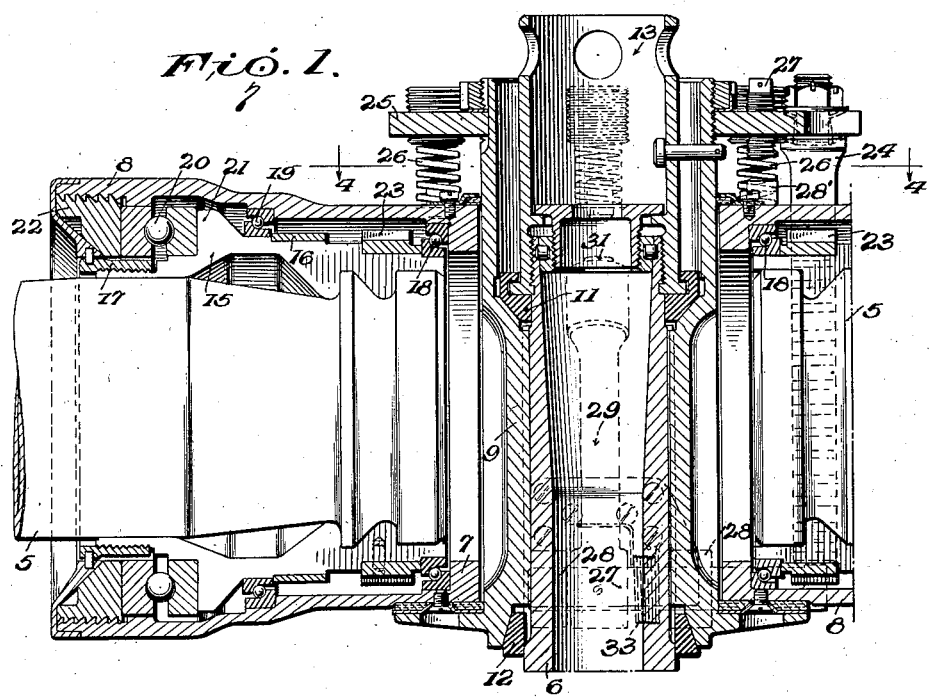
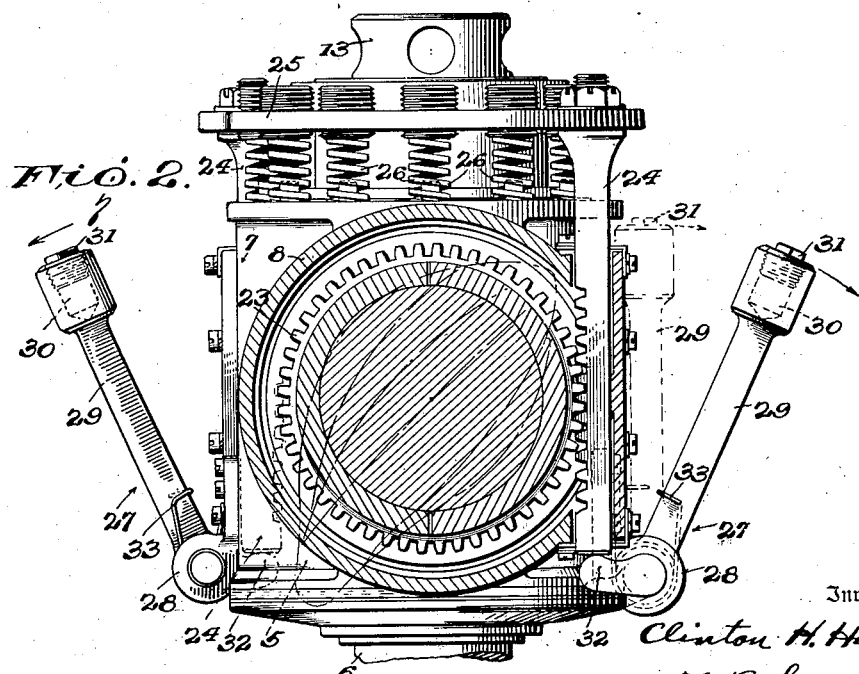
Inventor
Clinton H. Havill
F. B. Smith
Attorney March 27, 1934.     C. H. HAVILL     1,952,799
PROPELLER
Filed July 11, 1930     2 Sheets-Sheet 2

Inventor
Clinton H. Havill
F. B. Smith
Attorney

Patented Mar. 27, 1934

1,952,799

UNITED STATES PATENT OFFICE 1,952,799

PROPELLER

Clinton H. Havill, South Orange, N. J., assignor to Eclipse Aviation Corporation, East Orange, N. J., a corporation of New Jersey Application July 11, 1930, Serial No. 467,315

18 Claims. (Cl. 170—162)

This invention relates to propellers and more particularly to propellers having a plurality of blades the pitch of which may be varied during operation.

Various means have been heretofore proposed for securing the variation in angularity or pitch of the blades of a rotating propeller and the utilization of such means has resulted, in certain instances, in marked increases in propeller efficiency, especially in the cases of aircraft installations. Some of the devices of this character employed heretofore have been manually operated while others have been automatically actuated, depending for their operation upon one or more of the forces generated during rotation of a propeller. One of these last named forces, present during normal operation of a propeller, is that due to centrifugal force and aerodynamic force which exerts a torsional or twisting moment on the blade the former tending to reduce the pitch while the latter tends to increase the pitch. The torsion resulting from centrifugal force is greater than that due to aero-dynamic force, the result being that there is a marked tendency for the blade to reduce its pitch, that is, to turn the blade into the plane of rotation.

As above mentioned, this force resulting in a torsional moment, always tends to twist the blade into a position of zero pitch, and consequently, unless means are provided for balancing this centrifugal moment, a relatively large force is required to increase the pitch of the blades.

One of the objects of the present invention is to provide novel means for wholly or partially counteracting the torsional moment of the blades of a rotating propeller.

Another object of the invention is to provide in a variable pitch propeller, novel means responsive to centrifugal force for opposing the tendency of the blades to assume a zero pitch condition.

Still another object is to provide a propeller wherein the pitch of the blades is automatically varied, together with centrifugally actuated pivoted members for neutralizing the turning moment exerted on said blades because of centrifugal force.

A further object is to provide a novel variable pitch propeller embodying means responsive to the thrust of the blades for changing the pitch thereof in combination with means cooperating with the thrust-responsive means for opposing the torsional reaction of the blades.

The above and other objects of the invention will appear more fully hereinafter from the following detailed description when taken in connection with the accompanying drawings. It is to be expressly understood, however, that the drawings are for purposes of illustration only, and are not designed as a definition of the limits of the invention, reference being had for this purpose to the appended claims.

In the drawings, wherein similar reference characters refer to like parts throughout the several views:—

Fig. 1 is a horizontal section of a propeller embodying the present invention;

Fig. 2 is a side view, partly in section, of the parts illustrated in Fig. 1;

Figure 3:
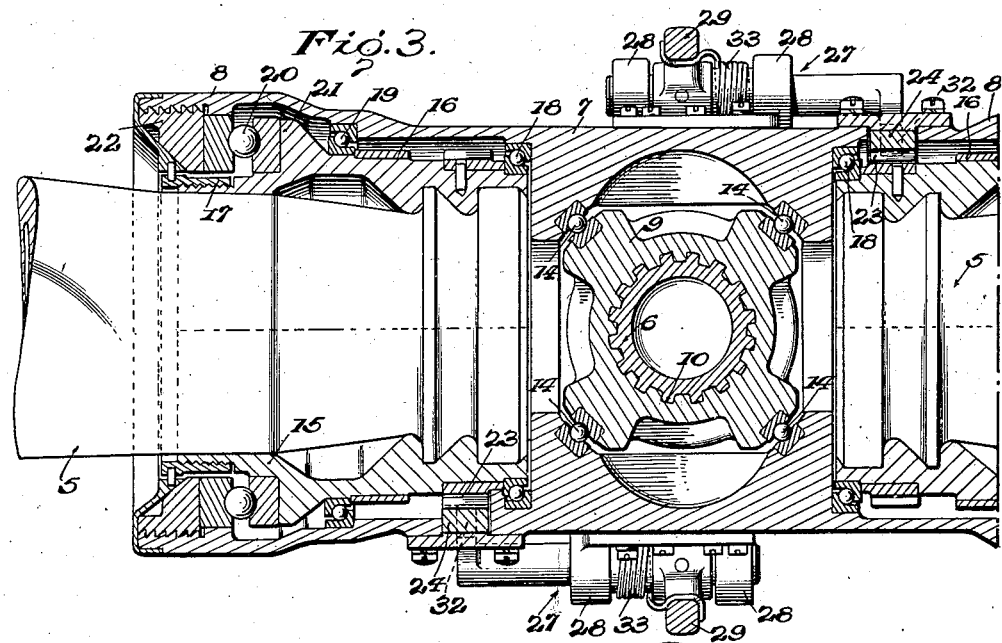
Fig. 3 is a sectional end view of the propeller.
Figure 4:
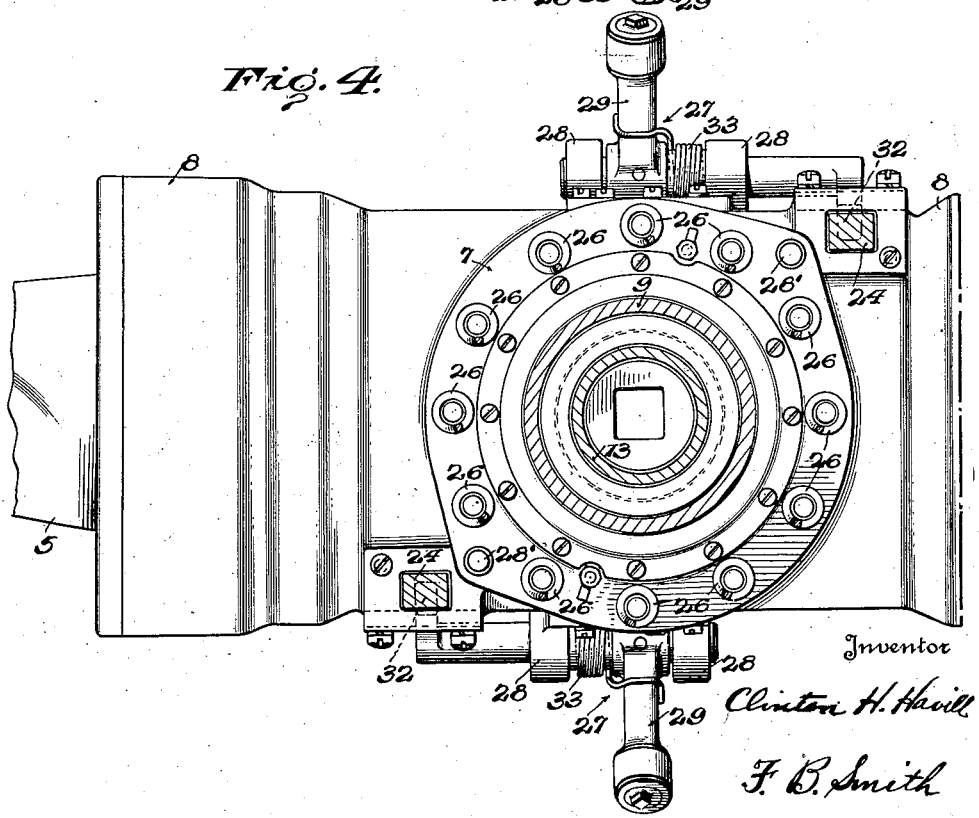
Fig. 4 is a view, partly in section, taken on line 4—4 of Fig. 1.

Referring now to the drawings, and more particularly to Figs. 1 and 3 thereof, a propeller embodying the principles of the present invention is illustrated therein as comprising a plurality of propeller blades 5 adapted to be rotated by a shaft 6, which may be an engine crankshaft or extension thereof. A portion only of the propeller blades is illustrated, in order that a large scale drawing may be utilized. As shown in Fig. 2, the blades 5 are of aerofoil section and so constructed that the center of gravity of each blade section is substantially coincident with the axis of rotation in order to reduce vibration.

In order to drivably connect the propeller blades to the shaft 6, there is provided a main hub forging 7 having a plurality of axially aligned sleeves or sockets 8 adapted to receive and rotatably support the root ends of the blades, in a manner to be referred to more specifically hereinafter. As shown, a driving block 9, rigidly fixed to the shaft 6 to rotate therewith by employing any suitable means such as keys 10, and which is maintained in proper position with respect to the shaft by means of split front and rear cones 11 and 12 respectively, adapted to be forced into firm engagement with said block by means of a nut 13 threadedly received by the outer extremity of the shaft, is interposed between the hub and driving shaft. A plurality of rows of ball bearings 14, are disposed between the driving block and hub in order to permit substantially frictionless longitudinal movement of the latter.

For ease in assembly, each of the root ends of the blades is provided with a split housing 15, the two halves of which are held in position by means of a retaining clamping ring 16 and a ring 17, the latter being threaded to the outer end of the housing. Each blade root together with its associated root housing is rotatably supported in the hub socket by means of bearing members 18 and 19, and in order to provide for the outward thrust of each blade due to centrifugal force, a ball thrust bearing 20 is confined between a shoulder 21, formed on the housing 15, and a nut 22, threaded into the open end of the socket 8.

Means are employed for changing the pitch of the blades during relative axial movement of the hub with respect to the driving shaft, which movement, in the form shown, is responsive to the thrust of the blades. Cooperating means, operable during such thrust-responsive movement of the hub, include relatively movable ring gear and toothed rack members 23 and 24 respectively, one for each blade, the former surrounding the root housing 15 and secured thereto, the latter fixedly secured in any suitable manner to a plate 25 carried by the driving block 9, Fig. 2, and extending through suitable apertures formed in the hub sockets 8. Referring more particularly to Fig. 2, it will be seen that forward movement of the hub will be effective to cause the ring gear 23 to roll along the relatively stationary rack member 24 to change the pitch, it being here noted that forward movement of the hub with respect to the drive shaft will decrease the pitch of the blades.

In order to predetermine the amount of thrust which will be necessary to initiate forward movement of the hub, with respect to the drive shaft to decrease the pitch of the blades, means are provided for yieldably resisting the thrust-responsive movement of the hub. In the form of the invention illustrated, such means are constituted by a plurality of resilient members such as springs 26, confined between the plate 25 and a portion of the hub 7 and the tension of these springs may be adjusted in any suitable manner, and as required. It will be understood that these resilient members normally tend to force the hub rearwardly, Fig. 2, wherein the pitch of the blades is a predetermined maximum. However, when a predetermined thrust is exerted by the blades, the hub will move forward slightly to decrease the pitch, as above pointed out, each of the springs 26 being then compressed slightly and consequently always tending to move the hub rearwardly to increase the pitch. It is pointed out that the tension of these springs is adjusted in such a manner as to arrest the forward movement of the hub at such a position that the resulting pitch will yield maximum propeller efficiency for the given conditions. If desired, positive stop means comprising cooperating adjustable members 27' and 28', Fig. 1, may be provided for positively limiting and predetermining the lower pitch limit.

As heretofore pointed out, during normal rotation of a propeller, centrifugal force acting on each blade exerts thereon a torsional or twisting moment which tends to reduce the pitch of the blades to zero. In Fig. 2 of the drawings, this centrifugal moment acts on the blade, the aerofoil section of which is indicated in dot and dash lines, to tend to twist the same in a clockwise direction about its longitudinal axis. This torsion reaction may be resolved into two components, one tending to force the hub upwardly, as viewed in this figure, to cause compression of springs 26 and thus decrease the pitch, and the other acting downwardly on the teeth of rack 24, tending to place the said rack in tension.

In order to compensate for the above-noted torsional moment, centrifugally-responsive means are provided, which during operation are effective to balance or neutralize each of the two components of the centrifugal moment referred to above. As shown, such means comprises a pair of levers indicated generally at 27, each of which is pivotally mounted in suitable ears 28, extending laterally from either side of the hub. Each lever has an outwardly extending arm 29 terminating in a hollow portion 30 adapted to receive suitable weights, not shown, a screw plug 31 being employed to confine these weights in position during operation. An arm 32 is fixed to each lever and is adapted to bear against the lower end of the rack 24, Fig. 2. Suitable means such as springs 33 are employed for normally maintaining these parts in the position shown in the drawings.

In operation, as above described, the torsional moment due to centrifugal force will tend to move the hub forwardly, or upwardly as viewed in Fig. 2, and will tend to place rack 24 under tension. However, the levers 27 are responsive to centrifugal force and will move outwardly in the direction of the arrow, Fig. 2, the arms 32 of said levers tending to compress racks 24, thereby balancing the tension therein, and the pivot of said levers, that is the hub, moving downwardly, as viewed in this figure, thereby neutralizing the forward movement of the hub due to torsion. By suitable theoretical and experimental determinations, the proper size and shape of levers 27 may be found which, in operation, will be effective to completely balance the torsional moment, if desired.

There is thus provided by the present invention a novel propeller of the variable-pitch type, wherein the pitch of the blades is controlled in an automatic manner and in which there is provided novel means whereby the effect of the centrifugal or torsional moment on the blades is substantially counteracted or eliminated. By employing thrust-responsive means for moving the hub and blades axially of the driving member to vary the pitch of the blades together with the centrifugally-actuated members cooperating with the pitch-varying means to balance the torsional moment, there is obtained a highly efficient and reliable propeller and one wherein the forces and stresses involved are controlled in a simple and effective manner, such a propeller being especially adaptable for use on aircraft wherein ease and positiveness of operation are of great importance.

While there has been shown and described only one embodiment of the invention, it is to be understood that the same is not limited thereto, but may be embodied in various mechanical forms. For example, means other than the levers, may be utilized for neutralizing the centrifugal moment of the blades, such as geared counterweights, it being understood, however, that the effect of all such means should be responsive to centrifugal force. It is also to be expressly understood that the use of the invention is not limited to aircraft, but may be employed in other installations.

Various changes other than those above mentioned may also be made in the relative sizes, shapes and arrangement of the component parts of the invention without departing from the spirit thereof, as will now be apparent to those skilled in the art. Reference will therefore be had to the appended claims for a definition of the limits of the invention.

What is claimed is:

1. In combination with a rotatable shaft, a hub axially movable with respect to said shaft, a plurality of blades carried by the hub, means for varying the pitch of said blades during such axial movement and means including weighted levers responsive to centrifugal force for yieldably opposing the axial movement of the hub.

2. A propeller having a plurality of blades, means including a hub for varying the pitch of the blades in accordance with the thrust thereof, resilient means for yieldingly opposing operation of said pitch-varying means, and other means for compensating for the centrifugal moment of the blades said last named means including weighted members pivoted to said hub.

3. The combination with a driving member of a hub longitudinally movable thereof, a plurality of blades rotatably carried by said hub, means for changing the pitch of the blades during longitudinal movement of the hub, and means including weighted levers responsive to centrifugal force for substantially balancing the tendency of said blades to assume a zero pitch condition.

4. In a propeller having a plurality of blades, means responsive to the thrust of the blades for varying the pitch of the latter, and other means to offset the centrifugal torsional moment of the blades said last named means including centrifugally-responsive members mounted independently of said pitch-varying means.

5. A device of the class described comprising a hub, a plurality of blades carried thereby, a rotatable shaft, means for drivably connecting the hub and shaft, thrust-responsive means for moving said hub axially of said shaft, means operable during such movement to change the pitch of said blades, and centrifugally-responsive means operable during such axial movement for opposing the effect of centrifugal torsion on the blades said last named means including members movable with respect to the hub.

6. A propeller having a rotatable shaft, a hub, a plurality of blades carried by the hub, means for drivably connecting the hub and shaft said hub being movable axially of said shaft in response to the thrust of said blades, cooperating gear means operable during such axial movement for rotating the blades about their longitudinal axes to vary the pitch and other means including levers pivoted to said hub and each having a portion operatively associated with said gear means for overcoming the centrifugal torsional moment of the blades.

7. A propeller of the class described comprising a hub, a plurality of blades carried thereby, means for driving said hub said hub being relatively movable with respect to said driving means in response to the thrust of said blades, relatively stationary means cooperating with said blades during such movement to rotate said blades with respect to the hub to change the pitch, and means including centrifugally-responsive weights for compensating for the centrifugal torsional moment of the blades.

8. The combination with a propeller including a shaft, of blades longitudinally movable with respect to the axis of said shaft and rotatable with respect to the axis of the blades, thrust-responsive means for automatically causing rotation of the blades to vary their pitch and means including centrifugally-responsive members for balancing the centrifugal torsional moment of said rotating blades.

9. A propeller comprising a plurality of blades, means for rotating said blades, means responsive to an increase in the thrust of said blades above a predetermined amount for decreasing the pitch of the blades, resilient means tending to increase the pitch of the blades and yieldingly opposing operation of said second named means for predetermining the amount of thrust for decreasing the pitch, and other means including a plurality of centrifugally-responsive masses for balancing the centrifugal torsional moment of said blades.

10. The combination with a driving member, of a hub longitudinally movable thereof, a plurality of blades rotatably carried by said hub, means for changing the pitch of the blades during longitudinal movement of the hub, means yieldably opposing longitudinal movement of the hub in one direction, and means including weighted members responsive to centrifugal force for substantially balancing the tendency of said blades to assume a zero pitch condition due to the centrifugal torsion thereof.

11. The combination with a driving member, of a plurality of propeller blades, a hub for rotatably receiving said blades, said hub being movable longitudinally of said driving member in response to the thrust exerted by said blades during operation, means for changing the pitch of the blades during longitudinal movement of the hub, and means including weighted members responsive to centrifugal force for substantially balancing the tendency of the blades to assume a zero pitch condition due to the centrifugal torsion thereon.

12. A propeller of the class described comprising a hub, a plurality of blades carried thereby, means for driving said hub, said hub being relatively movable with respect to said driving means in response to the thrust of said blades, a plurality of resilient members for yieldably opposing the relative movement of the hub with respect to the driving means, relatively stationary means cooperating with said blades during such movement to rotate said blades with respect to the hub to change the pitch, and means including centrifugally responsive weights for compensating for the centrifugal torsional moment of the blades.

13. A propeller of the class described comprising a hub, a plurality of blades carried thereby, means for driving said hub, said hub being relatively movable with respect to said driving means in response to the thrust of said blades, means for rotating said blades with respect to the hub to change the pitch during such movement of the hub, said means comprising a relatively stationary member operatively connected with the driving means, and connections between said member and said blades, and means including centrifugally responsive weights for compensating for the centrifugal torsional moment of the blades.

14. A propeller of the class described comprising a hub, a plurality of blades carried thereby, means for driving said hub, said hub being relatively movable with respect to said driving means in response to the thrust of said blades, a plurality of resilient members for yieldably opposing the relative movement of the hub with respect to the driving means, means for rotating said blades with respect to the hub to change the pitch during such movement of the hub, said means comprising a relatively stationary member operatively connected with the driving means, and connections between said member and said blades, and means including centrifugally responsive weights for compensating for the centrifugal torsional moment of the blades.

15. In a propeller having a plurality of blades, a shaft, a hub drivably connected to said shaft and carrying said blades, said hub being movable rectilinearly of said shaft in response to the thrust of said blades, means for varying the pitch of the blades during such movement of the hub, means for yieldingly opposing thrust-responsive movement of the hub relative to the shaft, said last named means normally maintaining the hub in such a position that the pitch of the blades will be a maximum, and other means tending to increase the pitch of the blades to partially compensate for the centrifugal torsional moment of the blades, said last named means including centrifugally-responsive members.

16. A propeller having a plurality of blades, a drive shaft therefor, means responsive to the thrust of the blades for moving the latter bodily with respect to said shaft, resilient means for yieldingly resisting such bodily movement, means operable during such movement to vary the pitch of the blades, and other means including centrifugally-responsive masses for neutralizing the centrifugal torsion on the blades due to centrifugal force.

17. A propeller for aircraft comprising a blade, driving means therefor, a hub for said blade drivably connected with said means but axially movable thereof in one direction in response to the thrust of said blade, means to decrease the pitch of said blade during thrust-responsive movement of the hub in said one direction, resilient means for yieldingly opposing such movement and normally maintaining said hub in a position relative to the driving means such that the pitch of the blade is a maximum, and other means including weighted members movable in response to centrifugal force for substantially neutralizing the torsional moment of said rotating blade.

18. In combination with a rotatable shaft, a hub axially movable with respect to said shaft, a plurality of blades carried by the hub and cooperating therewith to move the latter axially in response to the thrust of said blades, means operable during such axial movement to vary the pitch of said blades, and means including relatively-movable centrifugally-responsive members for compensating for the torsion of the blades.

CLINTON H. HAVILL.